United States Patent
Lee et al.

(10) Patent No.: US 6,914,329 B1
(45) Date of Patent: Jul. 5, 2005

(54) MICRO COOLING AND POWER SUPPLY STRUCTURE

(75) Inventors: E-I Lee, Hsinchu (TW); Jing-Lyang Jeng, Hsinchu (TW); Da-Jeng Yao, Hsinchu (TW); I-Te Huang, Hsinchu (TW)

(73) Assignee: Industrial Technology Research Institute, Jhudong (TW)

( * ) Notice: Subject to any disclaimer, the term of this patent is extended or adjusted under 35 U.S.C. 154(b) by 147 days.

(21) Appl. No.: 10/633,417

(22) Filed: Aug. 4, 2003

(30) Foreign Application Priority Data

Mar. 20, 2003  (TW) ........................................ 92204350 U

(51) Int. Cl.⁷ .......................... H01L 23/34; H02N 10/00
(52) U.S. Cl. ..................... 257/712; 257/415; 310/306
(58) Field of Search ................................ 257/712, 415, 257/618; 310/306

(56) References Cited

U.S. PATENT DOCUMENTS 6,417,060 B2    7/2002  Tavkhelidze et al.
6,720,704 B1 *  4/2004  Tavkhelidze et al. ........ 310/306

* cited by examiner

*Primary Examiner*—Mark V. Prenty
(74) *Attorney, Agent, or Firm*—Birch, Stewart, Kolasch & Birch, LLP

(57) ABSTRACT

A micro cooling and power supply structure is proposed, which includes an emitter end chip having an emitting surface, a collector end chip having a collecting surface that corresponds to the emitting surface and is separated from the emitting surface, and a plurality of micro cantilever beam components formed on the emitting surface. Each micro cantilever beam component has a projecting part as an electron emitter. A distance between the projecting part and the collecting surface is sensed by a sensor component and maintained by an actuating component at an optimal value to produce an electron tunneling effect, so as to lessen the requirement for a planar chip surface and the low work function material. With the capacity of the micro cantilever beam components to position the tunneling distance, the frequency of electron tunneling to the collecting surface is increased, and excellent cooling and power supply efficiency are achieved.

14 Claims, 10 Drawing Sheets

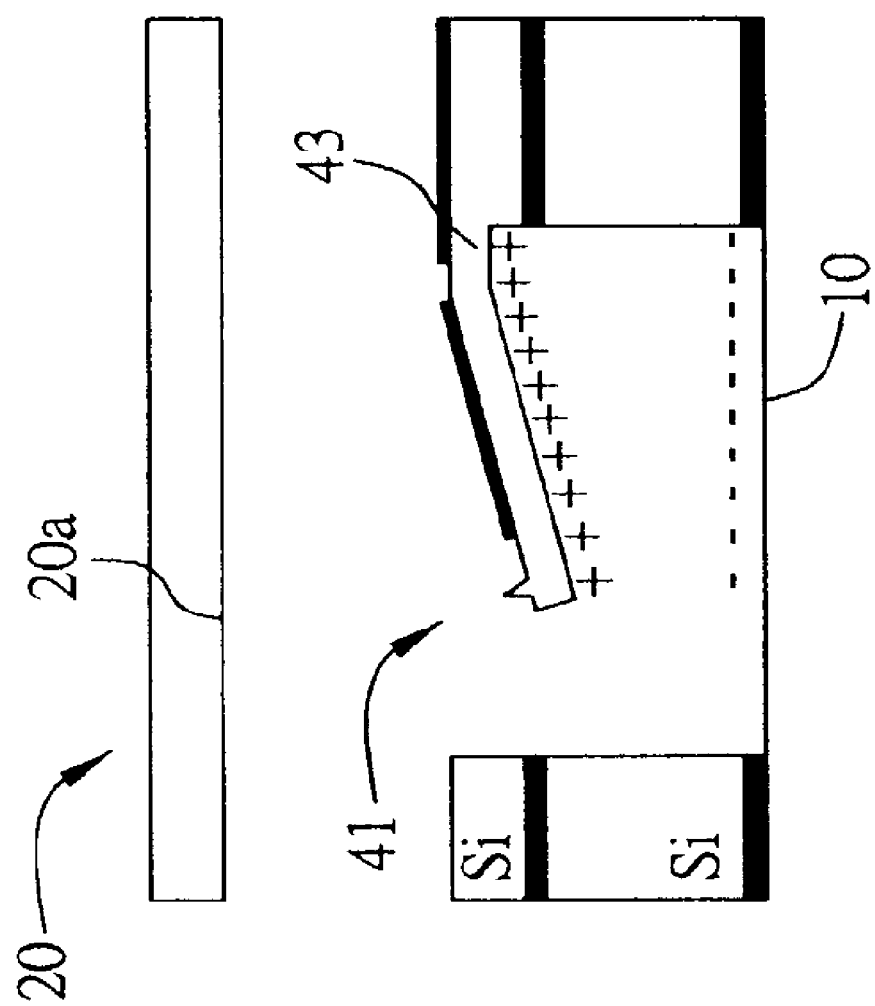

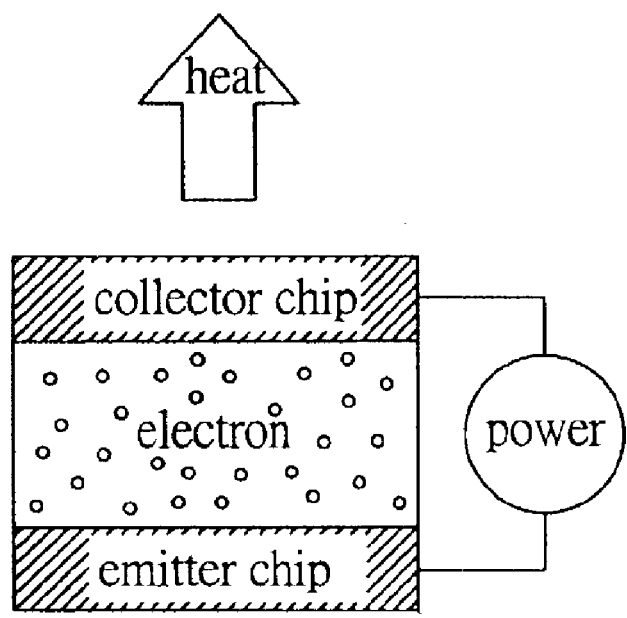
FIG. 5A
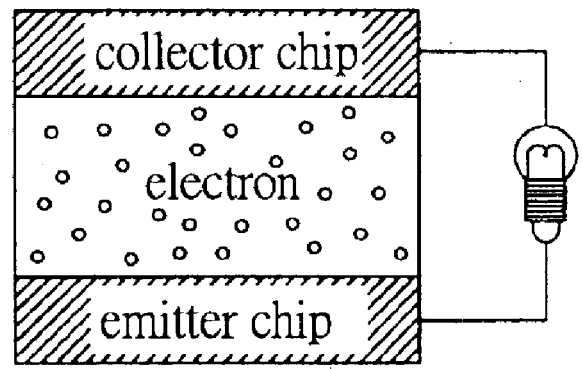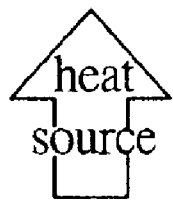
FIG. 5B

MICRO COOLING AND POWER SUPPLY STRUCTURE

This nonprovisional application claims priority under 35 U.S.C. §119 (a) on Patent Application No(s). 092204350 filed in TAIWAN, R.O.C. on Mar. 20, 2003, which is (are) herein incorporated by reference.

FIELD OF THE INVENTION

The present invention relates to electron tunneling type micro cooling and power supply structures, and more particularly, to an electron tunneling type micro cooling and power supply structure so as to minimize requirements for chip surface planarity and low work function material.

BACKGROUND OF THE INVENTION

The micro cooling and power supply structure refers to a structure in which an electron tunneling effect is produced to shift energy to a collector end chip in a chip module comprising an emitter end chip and the collector end chip which is separated from the emitter end chip by an insulation layer. The electron tunneling effect occurs when the emitter electron absorbs energy to break free from its lattice chain, thereby transmitting energy. The electron tunneling effect produces both cooling and power. supplying effects which are applicable to semiconductor devices, mechanical equipment, home appliances, cars, or the aviation industry, so as to achieve highly efficient heat dissipation in a small area or to generate additional electrical power from the exhaust heat in a system.

FIG. 5A illustrates the operating principle of the micro cooling structure, where a power supply is connected to an emitter/collector chip module. With an electromotive force applied by the power supply, electrons are driven to break free from the lattice chain of the emitter end and tunnel through the insulation layer to the collector end where the heat energy is dissipated. This is known as a heat generated micro cooling chip module. In addition, as shown in FIG. 5B, with an external heat source (such as exhaust heat) applied to the emitter end chip, the emitter end electrons having a higher heat energy can break free from the lattice chain and tunnel to the cooler collector end. And by such transmission, a heat generated micro power supply chip is formed to produce an electric current for generating electrical power, so as to supply power to an external electrical system (such as cooling fan).

The above-mentioned insulation layer is generally designed as a vacuum insulation layer based on the low heat conduction characteristics of a vacuum, and the lattice chain refers to the work function of the emitter end chip surface material, that is the energy required to excite electrons above the Femi energy level. Improving the electron tunneling energy, reducing the gap between the two chips, and minimizing the work function of the emitter end chip surface material are the best way to cause the electrons to break free from the lattice chain more easily to produce the electron tunneling effect, thereby improving efficiency in cooling and power generation. FIG. 6 graphs the relationship curves for the chip distance, material work function, operating temperature, drive electric field strength, and the heat dissipation efficiency calculated based on Quantum theory. As can be seen from the graph, when the work function of the emitter end chip surface material decreases with higher operating temperature and narrower chip gap, higher heat energy can be dissipated. That is, better cooling and power generation effects are achieved. But from observing the curves, it can be seen that the heat dissipation efficiency gradually drops if the gap (vacuum insulation layer thickness) between two chips becomes too small. So, a critical bottleneck for such technology is controlling surface planarity and the position of the two chips, such that their vacuum gap is accurately positioned in the nanometer range and an optimal electron tunneling distance is maintained The most well-developed cooling and power supply structures so far are the cool chips and power chips developed by Borealis Technical Limited in UK. U.S. Pat. No. 6,417,060, as illustrated in FIG. 7A through to FIG. 7E, discloses a monocrystal substrate 50 to serve as an emitter end 55 of the electron tunneling chip module. Then, a metal film 51 (such as PB, Mo, or Ti) is deposited on the substrate 50. Next, a thin copper layer 52 with a 5 $\mu$m thickness is deposited as illustrated in FIG. 7C before growing a thick copper layer 53 with 650 $\mu$m thickness by an electrochemical method as shown in FIG. 7D which serves as a collector end chip 56 for electron tunneling. The deposited layer is then separated by a heat peeling or mechanical peeling method, while the metal film 51 on the substrate 50 is removed by liquid nitrogen, so that the emitter end and the collector end chips 55, 56 having complementary surfaces are obtained as illustrated in FIG. 7E, in order to minimize the surface planarity problem via the complementary surfaces. However, such a design allows only a fixed gap to be maintained between two chips, but not always the optimal electron tunneling vacuum gap. As the chip is influenced by environmental factors, such as heat expansion and lattice heat-induced vibration at high operating temperatures, the vacuum distance between the two chips may change during operation. And even if the distance changes. by only several nanometers, the cooling and power supply effects can be significantly and often adversely affected (as illustrated in FIG. 6).

Furthermore, this prior art employs a positioning platform to enhance positioning of the vacuum gap between the two chips as illustrated in FIGS. 8A and 8B. FIG. 8B illustrates an elevation view of FIG. 8A, where the collector end chip 56 is moved by four Piczo-electric positioners 60 to carry out nanometer range position adjustments monitored by three inductive position sensors 61, which provide control signals based on current variations. Although distance control for the vacuum gap can be enhanced by such a design, the position of the entire chip is shifted instead of shifting sub-regions of the chip independently as appropriate to achieve maximum efficiency. It appears unlikely that this method can achieve optimal control of vacuum gap distance over the various regions of the chip since environmental factors (such as heat expansion) are difficult to control, or adjust for in actual application. This, then, limits electron tunneling efficiency during the operation. And fabrication cost is increased by this prior art method, making it difficult to be carried out on a mass production scale in the commercial market.

Therefore, it is understood. that the vacuum gap that serves as the electron tunneling path in all the prior arts is minimally adjustable, and the gap value is often difficult to maintain via nanometer positioning at an optimal electron tunneling distance, leading to a decrease in the cooling and power supply efficiency. And if there is a slight error in the chip surface planarity or a change in environmental factors, the electron tunneling effect is reduced significantly. Meanwhile, the higher work function material cannot be adopted to fabricate the emitter end chip. Thus, this poses a big limitation in commercial application.

Summarizing the above, it is an urgent issue in this technology field to design an electron tunneling type. micro cooling and power supply device which minimize the requirement for chip surface planarity while maintaining the nanometer gap of the vacuum insulation layer by optimally spacing the electron tunneling distance to minimize the tunneling potential and the need for low work function material, so as to achieve an excellent cooling and power supply efficiency.

SUMMARY OF THE INVENTION

An objective of the present invention is to provide a micro cooling and power supply structure capable of adjusting the chip gap (between the emitter end and the collector).

A further objective of the invention is to provide a micro cooling and power supply structure that minimizes the requirement for chip surface planarity.

Another objective of the invention is to provide a micro cooling and power supply structure that minimizes the requirement for low work function of the chip surface material.

Another objective of the invention is to provide a micro cooling and power supply structure for carrying out nanometer range positioning of the chip gap.

A yet another objective of the invention is to provide a micro cooling and power supply structure to achieve excellent cooling and power supply efficiency.

And another objective of the invention is to provide a micro cooling and power supply structure that can be mass-produced, possibly in batches.

In accordance with the above and other objectives, the invention proposes a micro cooling and power supply structure. The structure comprises an emitter end chip having an emitting surface, a collector end chip having a collecting surface that corresponds to the emitting surface which is spaced apart from the emitting surface, and a plurality of micro cantilever beam components formed on the emitting surface. Each micro cantilever beam component has a projection part that serves as an electron-emitting end of the emitter end chip, a sensor component for sensing the distance between the projection part and the collecting surface, and an actuator component for driving the micro cantilever beam component according to the distance sensation of the sensor component so as to maintain a pre-determined distance between the projection part and the collecting surface.

The emitting surface and the collecting surface are parallel to each other and are separated by a vacuum insulation layer having a nanometer range thickness. The plurality of micro cantilever components are formed on the emitting surface by Micro Electro Mechanical System (MEMS) process technology, and the projection parts, sensor components and actuator components are formed by the bulk micromachining and surface micromachining methods of the MEMS process technology. Moreover, the micro cantilever beam components are evenly arranged over the entire emitting surface in an array fashion. And the pre-determined distance maintained between the projection part and the collecting surface is the optimal distance for electrons on the emitting surface to easily produce the electron tunneling effect.

According to the present invention, the nanometer range electron tunneling gap required is achieved by small adjustments made by the micro cantilever beam components in micron range. The micro cantilever beam components can actively adjust the distance to compensate for with surface fluctuations in the collector end chip or changes in environmental factors using the sensor and actuator components, so as to maintain the optimal distance for electron tunneling at any time. As a result, the requirements for chip surface planarity and material low work function are minimized. And, when the present invention is applied to electron heat dissipation and power generation by exhaust heat, excellent cooling and power supply can be achieved.

Summarizing the above, the micro cooling and power supply structure of the present invention indeed improves the frequency and steadiness of electron tunneling from the emitter end chip, and it reduces fabrication complexity. Moreover, a commercialized mass production requirement is satisfied via the MEMS process, so as to thoroughly solve the problems associated with the prior art structure.

BRIEF DESCRIPTION OF THE DRAWINGS

The present invention can be more fully understood by reading the following detailed description of the preferred embodiments, with reference made to the accompanying drawings, wherein:

FIG. 4 is a schematic diagram illustrating the micro cantilever beam structure in operation according to the second embodiment of the invention;

FIG. 5A is a schematic diagram illustrating the micro cooling effect;

FIG. 5B is a schematic diagram illustrating the micro power supply effect;

FIG. 7A through to.

DETAILED DESCRIPTION OF THE PREFERRED EMBODIMENTS

Figure 1A:
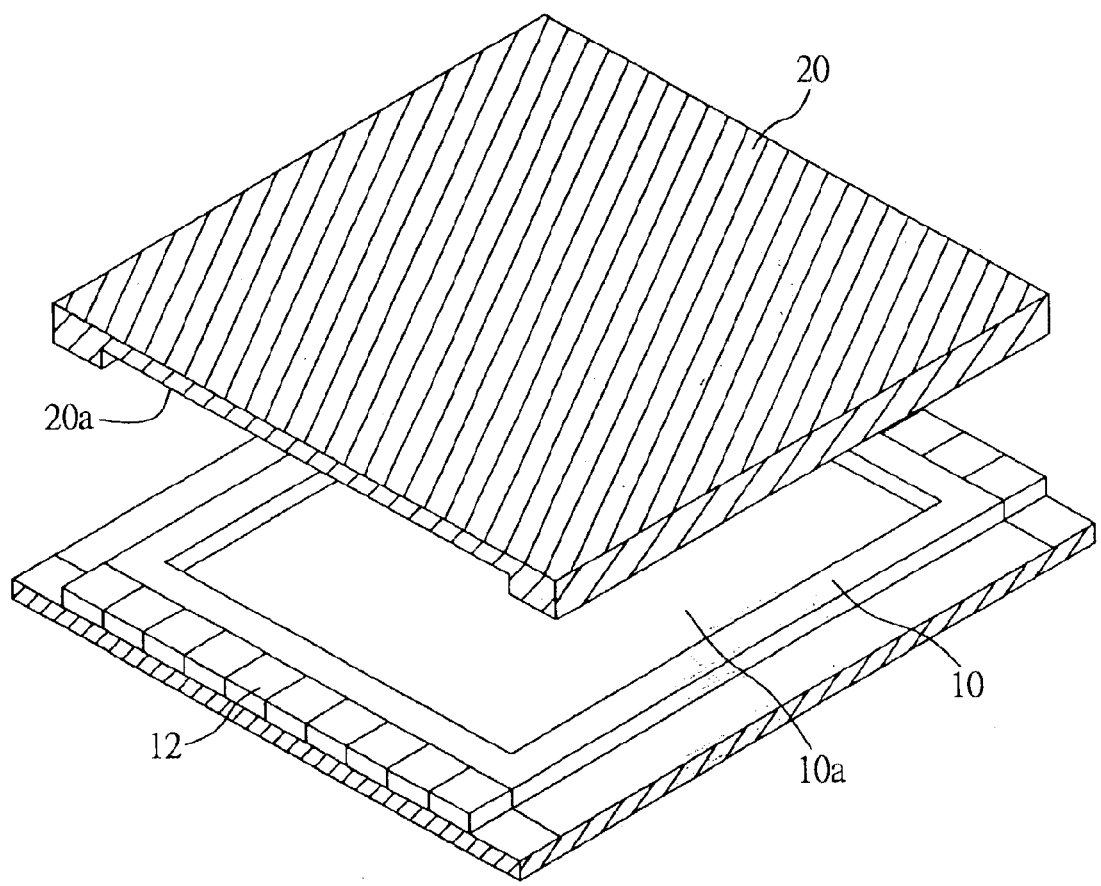
FIG. 1A through to FIG. 1C are schematic diagrams illustrating a micro cooling and power supply structure according to one preferred-embodiment of the invention.
Figure 1B:
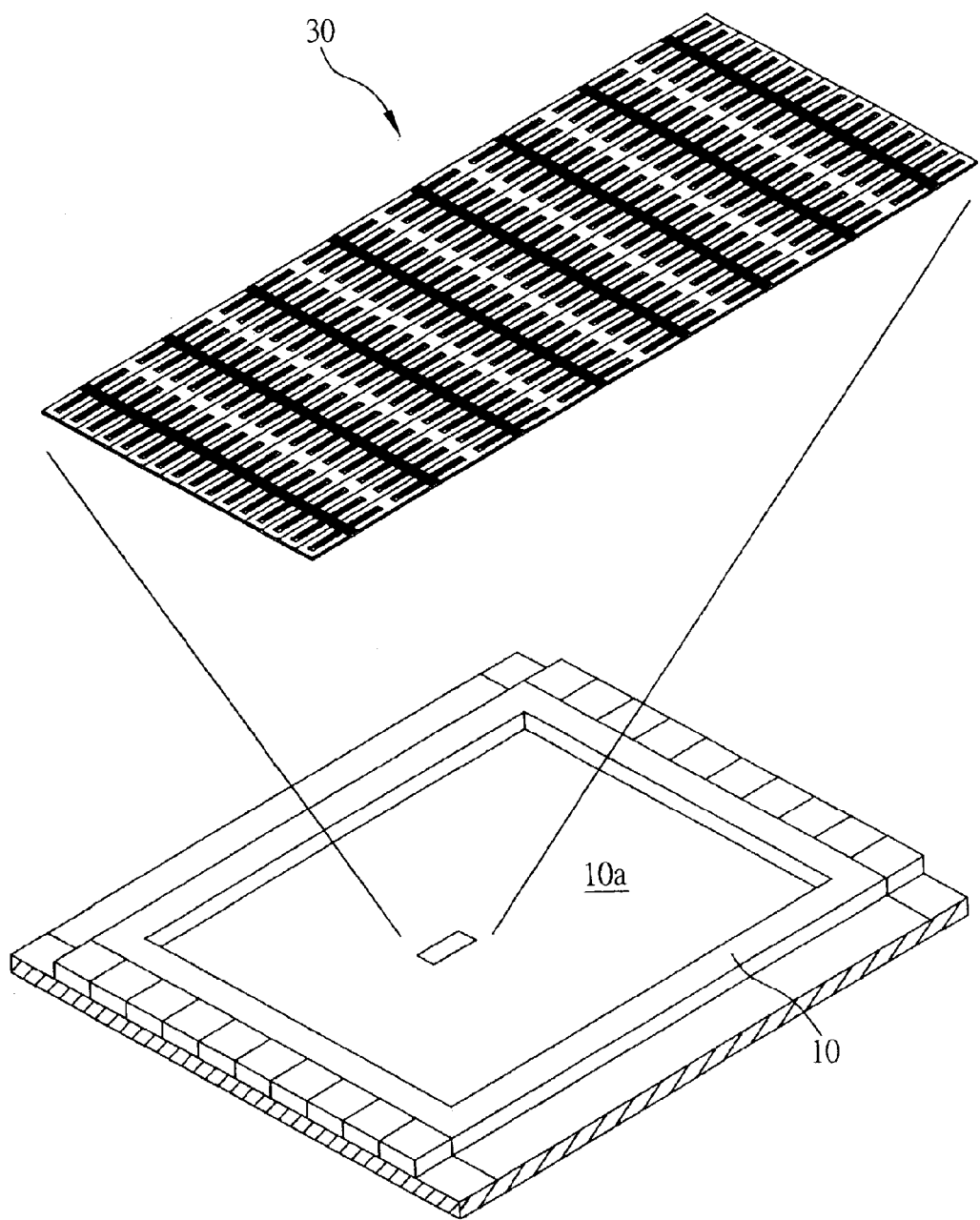
Figure 1C:
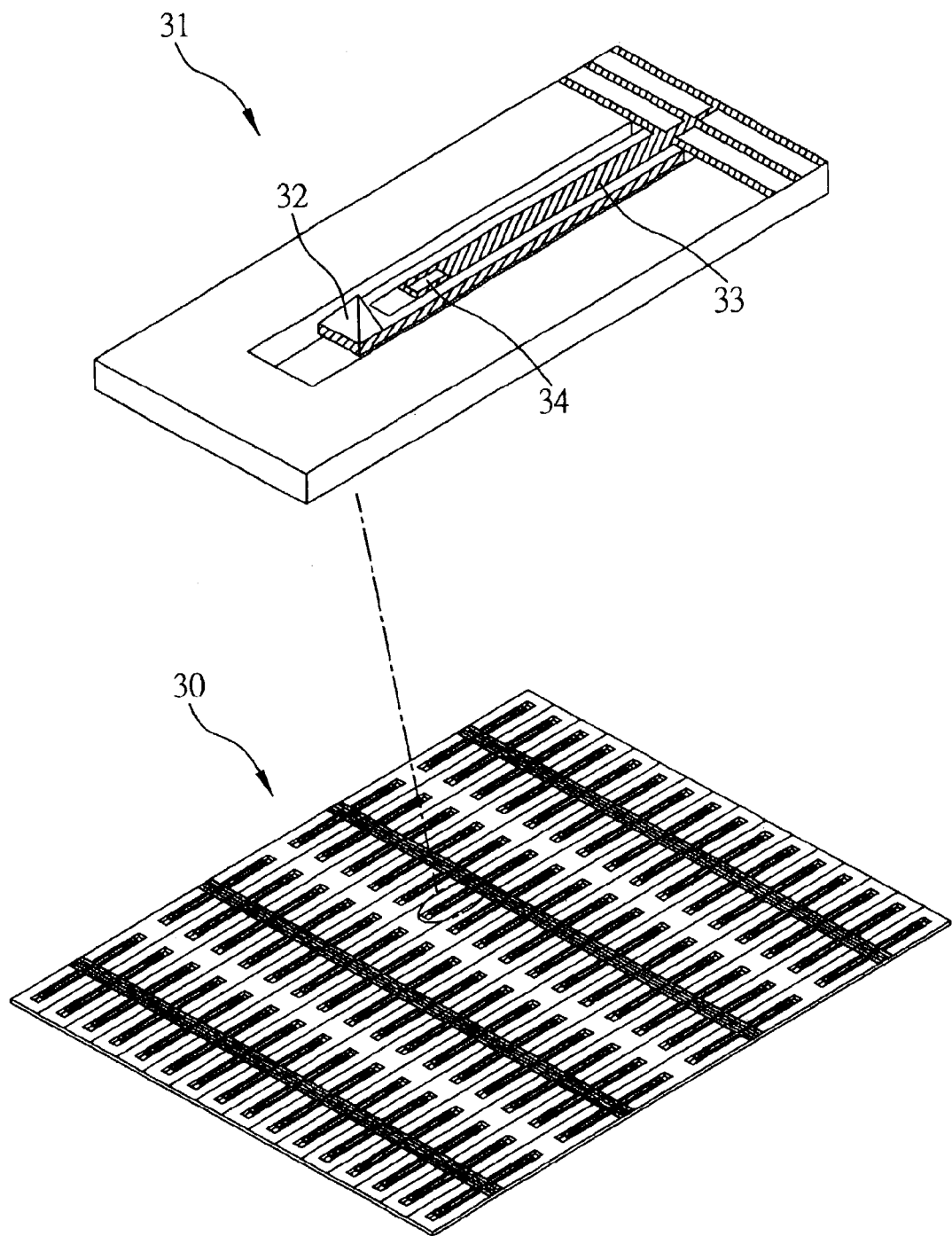
Figure 2A:
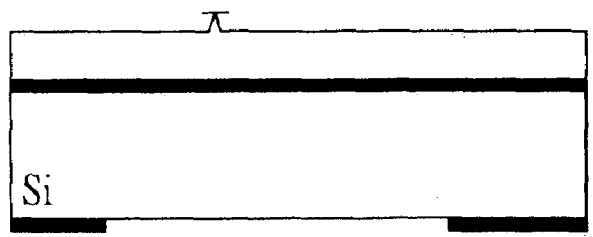
FIG. 2A through to FIG. 2D are cross-sectional views illustrating the process of machining a micro cantilever beam structure according to one preferred embodiment of the invention.
Figure 2B:
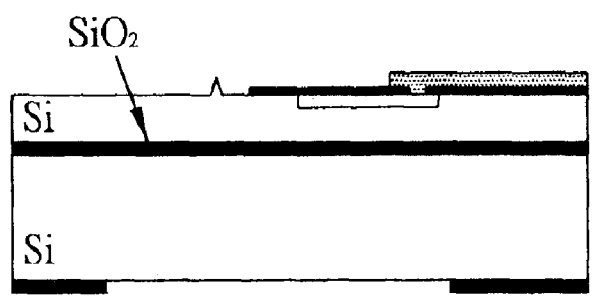
Figure 2C:
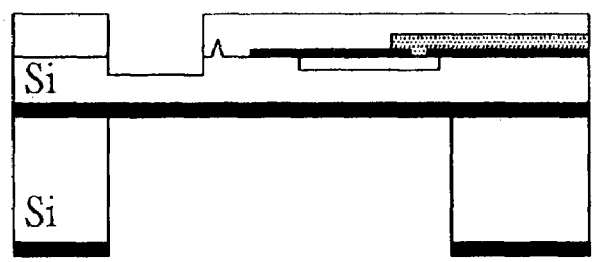
Figure 2D:
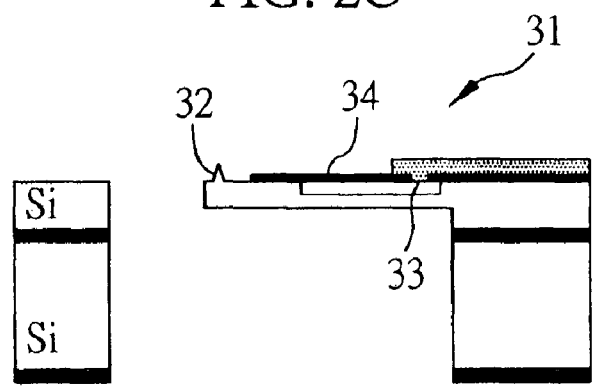

FIG. 1A, 1B, and 1C are schematic diagrams illustrating a micro cooling and power supply structure according to one preferred embodiment of the present invention. The microstructure is formed with a chip module having an emitter end chip 10 and a collector end chip 20 that is encased above the emitter end chip 10. The emitter end chip 10 has an emitting surface 10a, while the collector end chip 20 has a collecting surface 20a that corresponds to the emitting surface 10a, and the two surfaces 10a, 20a are separated by a vacuum insulation layer having a nanometer range thickness. The emitting surface 10a of the emitter end chip 10 is machined in such a way that it has a micro cantilever beam array structure 30 with from a few thousand to many thousand sets of micro cantilever beam components 31 arranged as shown in FIG. 1B, which enable electrons in the emitter end chip 10 to emit from the micro cantilever beam components 31 and tunnel through the vacuum insulation layer between the two chips 10 and 20. FIG. 1B is a schematic diagram illustrating an enlarged view of the array structure 30, whereas FIG. 1C is a schematic diagram illustrating an enlarged view of a single micro cantilever beam component 31. On the array structure, each micro cantilever beam component has a front end with a pyramidal projection 32 that serves as an electron emitter during electron tunneling for the emitter end chip 10. A gap between the tip of the pyramidal projection end 32 and the collecting surface 20a provides tunneling path for the electrons. Each of the micro cantilever beam component 31 has an adjustable displacement capability provided by a mechanism connected to the chip control connector 12 of the emitter end chip 10 such that each micro cantilever beam component 31 can respond according to the collecting surface 20a to actively adjust distance to compensate for changes in environmental factors to effect an optimal control of displacement. As a result, an optimal electron tunneling distance is maintained with respect to the collecting surface 20a.

The micro cantilever beam array structure 30 is fabricated in a uniform and large batch by a Micro-Electro Mechanical System (MEMS), so that each micro cantilever beam component 31 has a nanometer range size. However, there are no specific limitations on the detailed dimensions, array arrangement, and arrangement density. Depending on the desired micro cooling and power supply structure, each micro cantilever beam component 31 has an accurate adjustable positioning mechanism, so as to obtain an optimal electron-tunneling gap in the nanometer range via MEMS process technology. So, once the chip module structure is combined with a power supply, heat dissipation system, or exhaust heat source after packaging, highly effective cooling and power supply can be achieved to fulfill requirements needing electronic heat dissipation and/or power generation by exhaust heat.

The micro cantilever beam array structure 30 of FIG. 1C is produced by a bulk micromachining technology in a lattice orientation. The micro cantilever beam array structure 30 is etched by a reactive ion etching (RIE) method, with the front end of each micro cantilever beam component 31 having a projection 32 for emitting electrons for the tunneling effect, the pyramidal projection 32 being related to the lattice orientation of the material for the micro cantilever beam components 31. And, in order to facilitate the adjustable positioning capability, each micro cantilever beam component 31 can be subjected to a surface micromachining technology during manufacturing such that a transducer for sensing the distance is fabricated on each micro cantilever beam component 31. The transducer comprises at least a sensing component 34 and an actuating component 33. In the present embodiment, the transducer is designed as an assembly of a Piezo-resistive sensor and a Piezo-electric actuator in such a way that the Piezo-resistive and Piezo-electric materials are coated on the micro cantilever beam component 31 according to a pre-designed circuit, so as to form a distance sensor 34 (including its corresponding sensor circuit) applying the Piezo-resistive effect for sensing the thickness of the vacuum insulation layer between pyramidal projection of the micro cantilever beam component 31 and the collecting surface 20a. And, depending on the sensor value, the voltage to be applied to the Piezo-electric actuator 33 (including its corresponding actuator circuit) is determined and generated. Based on the voltage value applied, the actuator 33 produces a Piezo-electric effect, wherein electrical energy is transformed into a mechanical energy, causing a conformation which drives a position shift or displacement of the micro cantilever beam component 31. In the present embodiment, the Piezo-electric type actuation method employed has several advantages, such as fast reaction speed, steady output of position shift, and so on. Depending on the designer's efficiency requirement and cost constraints, the sensor 34 and the actuator 33 are not limited to those types disclosed in the present embodiment.

FIG. 2A through FIG. 2D are cross-sectional views illustrating the machining process for one micro cantilever beam component 31 of the micro cantilever beam array structure 30 according to the present embodiment. Since micro machining is a well developed process technology with many possible variations, fabrication of the above-mentioned structure is not limited to those illustrated in the diagram, as the array structure 30 having the same effect can be fabricated by many conventional processes.

Figure 3:
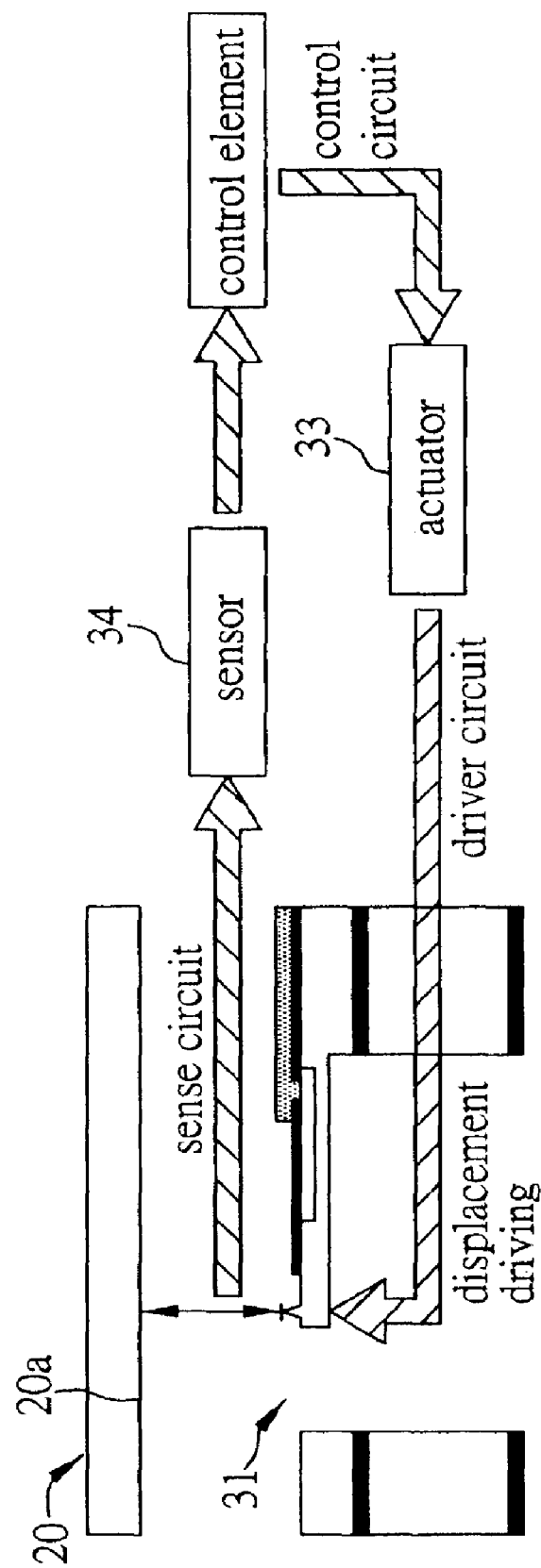
FIG. 3 is a process block diagram illustrating the micro cantilever beam structure in operation according to one preferred embodiment of the invention.
Figure 6:
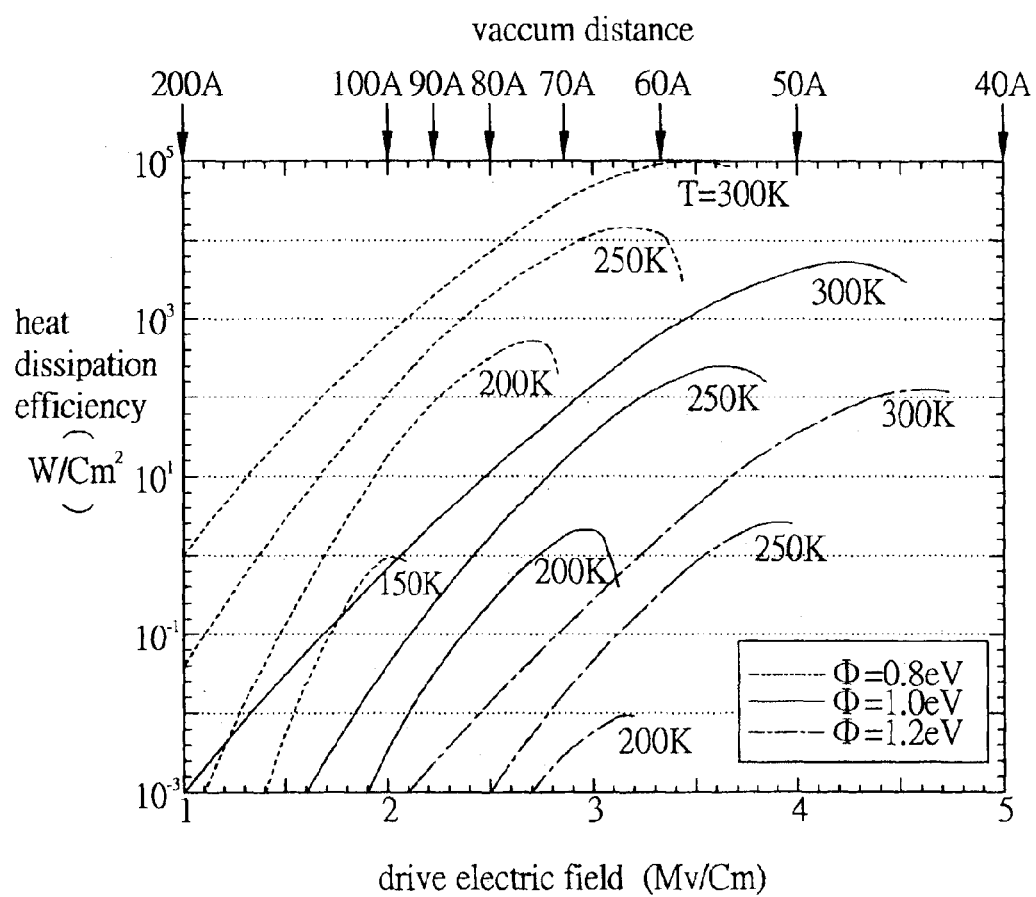
FIG. 6 is a relationship curve graph illustrating the cooling and power supply phenomena associated with the electron tunneling effect under various conditions.
Figure 7A:
Figure 7B:
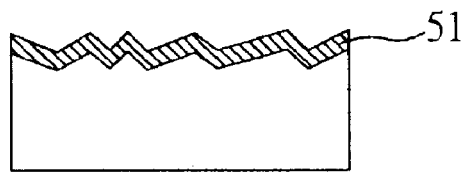
Figure 7C:
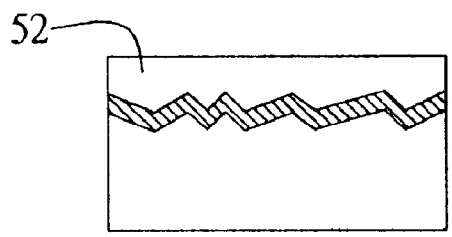
Figure 7D:
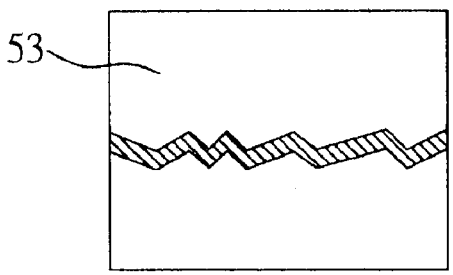
Figure 7E:
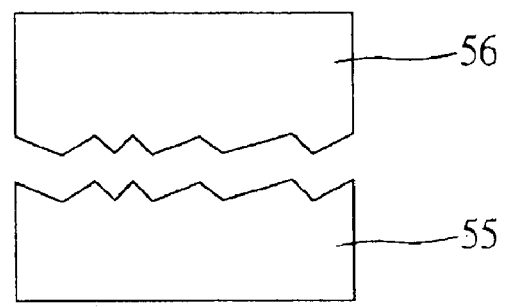
FIG. 7E are cross-sectional views illustrating the process of machining the micro cooling and-power supply structure according to the prior art.
Figure 8A:
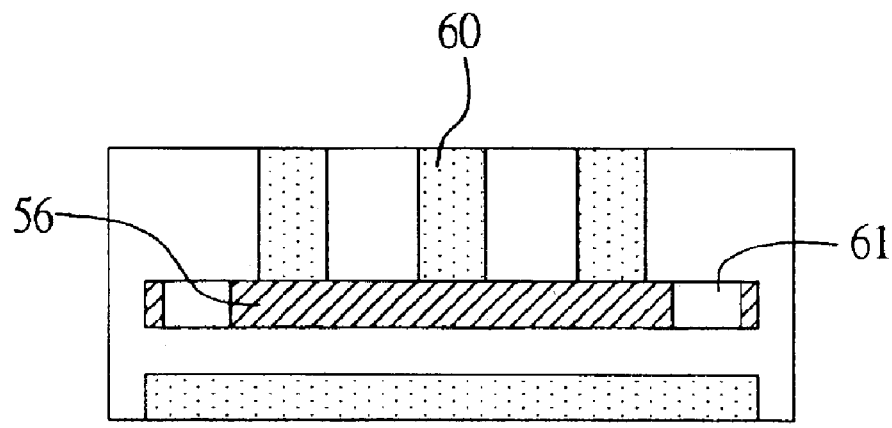
FIG. 8A is a cross-sectional view illustrating the micro cooling and power supply structure according to the prior art.
Figure 8B:
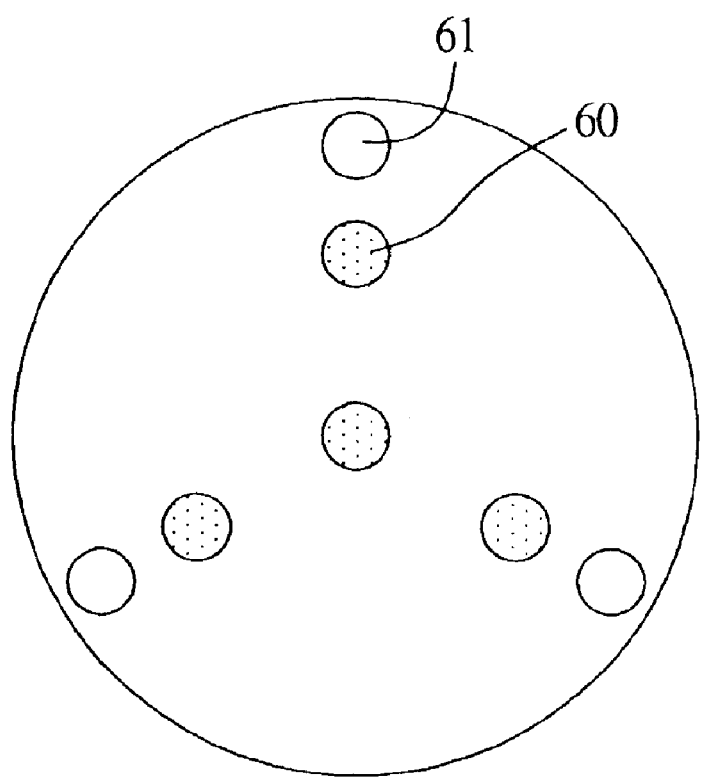
FIG. 8B is an elevation view of the micro cooling and power supply structure according to the prior art illustrated in FIG. 8A.

FIG. 3 is a process block diagram illustrating the operation of the transducer on the micro cantilever beam component 31. After the sensor 34 detects the distance between the pyramidal projection of the micro cantilever beam component 31 and the collecting surface 20a via the Piezo-resistive effect, the distance value is transmitted to a control element connected to the chip module control connector 12. If the distance value is too large, that is, the electron tunneling path distance is larger than the optimal distance, the number of electrons that tunnel from the emitter end chip 10 to the collector end chip 20 will be reduced (since-tunneling frequency decreases with a higher tunneling potential). Based on the exceedingly small distance value, the control element commands the actuator 33 via the control circuit to apply a higher voltage in order to cause a conformational change for the micro cantilever beam component. As a result, the pyramidal projection 32 moves towards the collector end chip 20 to reduce thickness of the vacuum insulation layer between the pyramidal projection 32 and the collector end chip 20 until the optimal distance for electron tunneling is reached, so that the highest frequency for electron tunneling is achieved. Likewise, when the sensor value from the sensor 34 is low due to the pyramidal projection 32 being too close to the collecting surface 20a, the electron tunneling effect is also decreased. The micro cantilever beam component 31 is then driven by the previously mentioned electrical circuit to produce the reverse conformational change, so that the distance between the pyramidal projection 32 and the collecting surface 20a is increased. The diagram provided illustrates only the basic operation process for the transducer (displacement-control mechanism) of the micro cantilever beam component 31, while its detailed operation plan and circuit design depends on the dimensions of the micro cantilever beam component and the type of the transducer chosen.

Since the emitter end and collector end chips 10, 20 do not have a uniform surface planarity, machining accuracy for each micro cantilever beam component 31 in the micro cantilever beam array structure 30 is not the same. So, the distance from the pyramidal projection 32 of each cantilever beam component 31 to the collecting surface 20a is not identical. But, as each cantilever beam component 31 is formed with an independent transducer (the sensor 34 and the actuator 33) as previously described, the position of the micro cantilever beam component 31 can be adjusted according to each sensed electron tunneling distance, allowing all pyramidal projections of the micro cantilever beam component 31 across the entire array structure 30 to individually space from the collecting surface 20a by the optimal distance. And with influencing factors, such as temperature changes and external vibration during operation, the chip may experience expansion/contraction Or heat-induced lattice heat vibration and other heat disturbance phenomena, which necessitate adjustment of the tunneling distance in order to compensate. Also, the micro cantilever beam component 31 can revert back to the previous optimal position via the conformational change effected by the transducer on each micro cantilever beam component 31. Therefore, with the transducer design on the micro cantilever beam component 31 as previously described, tunneling distances matching all optimal tunneling distance values can be maintained too provide the optimal path with a highest frequency of electron tunneling and lowest tunneling potential by employing a mathematical function and adjustment mechanism. Employing an adjustable mechanism reduces requirements for chip surface planarity and accuracy during fabrication of the micro cantilever beam components and avoids the electron tunneling distance being influenced by the operating environment, so as to position the optimal distance in the nanometer range. Thus, the requirement for low work function of the chip's surface material is minimized by the positioning capability of the micro cantilever beam components 31, as material with a common work function (for example, material with a work function higher than 1.2 eV) is all that is required to achieve excellent cooling and power supply effects.

Accordingly, the micro cantilever beam array structure 30 has an adjustable function and nanometer positioning capacity for producing excellent cooling and power supply effects as the user selects different operation parameters. For instance, when an external voltage is applied across the two chips 10, 20, tunneling electrons of the emitter end absorb heat and tunnel to the collector end via the micro cantilever beam projections 32 to effect heat dissipation. This is known as a micro cooling structure. Alternatively, an electric current is produced to generate electricity where by emitter end electrons having a higher potential tunnel to the collector end where have a lower potential. This is known as a micro power supply structure.

Apart from the preferred embodiment disclosed previously, there are many similar structures for achieving the same effect of the present invention. For instance, other types of micro cantilever beam components, micro cantilever beam components having other emitter ends, or suspension mechanisms/arms provided by other manufacturing techniques such as thin film. There are also many similar options for the sensor and actuator of the cantilever beam component. FIG. 4 is a side view illustrating a single micro cantilever beam structure. In this second embodiment, the previously described Piezo electric type actuator 33 is substituted by an electrostatic actuator 43, where a voltage is applied across the micro cantilever beam 41 and tie surface of the emitter end chip 10 to produce a potential difference, so that the electrostatic power resulting from the potential difference drives a position shift of the micro cantilever beam 41 in order to adjust for an optimal vacuum distance, the value of the applied voltage being determined by the distance value detected using a sensor on the micro cantilever beam 41. If the applied voltage value is increased, the degree of shifting the position of the micro cantilever beam 41 is also increased. Thus, the second embodiment also provides steady position shift output and excellent control, while the electrostatic actuator 43 that it uses can be fabricated more easily and with lower material costs.

Furthermore, depending on the user's fabrication budget and positioning requirements, the transducer of each micro cantilever beam can be substituted by other types of micro sensors, such as sensor components based on capacitive sensing, inductive sensing, optical sensing, and electron tunnel sensing principles, all machined by MEMS process. Moreover, other micro actuators are possible, such as actuator components fabricated by capacitive actuating, inductive actuating, electromagnetic actuating, memory alloy actuating, and heat actuating methods. For instance, if the micro structure for cooling and supplying power is to be used in a harsh environment, the electromagnetic type actuator may be considered. And if the requirement for dimension accuracy is lower, the heat actuating type actuator may be considered instead.

The design of the present invention only requires the adjustable micro cantilever beam structure that appropriately adjusts the distance between the emitter end chip and the collector end chip in the nanometer range. So, the micro cantilever beam array structure is not limited to being formed on the emitter end chip, as it can also be designed and machined on the surface of the collector end chip,.while the emitter end surface can be made as an array type electron emitting tip, this combination achieving the same positioning effect. However, for such an electron tunneling path in a point-to-point form, the tunneling frequency and orientation/positioning of the electrons are harder to predict, and the cooling and power supplying effects to be achieved by the structure are also harder to estimate.

Summarizing the above, the micro cooling and power supply structure in the present invention indeed reduces requirements for chip surface planarity and structure accuracy. And with its positioning ability of the electron tunneling distance, the vacuum insulation layer in the nanometer range distance is optimally maintained to minimize the tunneling potential and need for chip surface material with a low work function, so that an excellent cooling arid power supplying efficiency is achieved. Moreover, via the MEMS process which is capable of fabrication in batches, commercialized mass production can be carried out.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A micro cooling and power supply structure, comprising:
    an emitter end chip having an emitting surface;
    a collector end chip having a collecting surface that corresponds to and is separated from the emitting surface; and
    a plurality of micro cantilever beam components formed on the emitting surface, wherein each of the micro cantilever beam components at least has a projecting part that serves as an electron emitter on the emitting surface, a sensing component for sensing a distance between the projecting part and the collecting surface, and an actuating component for maintaining a predetermined distance between the projecting part and the collecting surface according to the distance sensed by the sensing component.

2. The micro cooling and power supply structure of claim 1, wherein the plurality of micro cantilever beam components are formed on the emitting surface of the emitter end chip in the use of a micro engineering technique.

3. The micro cooling and power supply structure of claim 1, wherein the micro cantilever beam components are arranged in an array over the entire emitting surface.

4. The micro cooling and power supply structure of claim 1, wherein the predetermined distance maintained between the projecting part and the collecting surface is an optimal distance for emitted electrons to produce an electron tunneling effect.

5. The micro cooling and power supply structure of claim 1, wherein the projecting part a pyramidal projection formed in accordance with a lattice orientation of the micro cantilever beam component.

6. The micro cooling and power supply structure of claim 1, wherein the sensing component comprises a sensor and a corresponding sensor circuit.

7. The micro cooling and power supply structure of claim 1, wherein the actuating component comprises an actuator and a corresponding actuator circuit.

8. The micro cooling and power supply structure of claim 6, wherein the sensor is one selected from the group consisting of piezo-resistant, capacitive, inductive, optical, and electron tunneling micro sensors.

9. The micro cooling and power supply structure of claim 7, wherein the actuator is one selected from the group consisting of piezo-electric, capacitive, inductive, electrostatic, magnetic, memory alloy, and heat-generating micro actuators.

10. The micro cooling and power supply structure of claim 1, wherein the emitting surface is parallel to the collecting surface.

11. The micro cooling and power supply structure of claim 1, wherein the emitting surface is separated from the collecting surface by a distance of nanometer scales.

12. The micro cooling and power supply structure of claim 1, wherein a vacuum insulation layer is disposed between the emitting surface and the collecting surface.

13. The micro cooling and power supply structure of claim 1, wherein a potential difference is applied across the emitter end chip and the collector end chip to allow electrons on the emitting surface to produce an electron tunneling effect and move to the collecting surface so as to form a micro cooling mechanism.

14. The micro cooling and power supply structure of claim 1, wherein the emitter end chip absorbs heat from a heat source to allow electrons to produce an electron tunneling effect and move to the collecting surface so as to form a micro power supply mechanism.

* * * * *